United States Patent [19]

Hamblin

[11] Patent Number: 4,968,175
[45] Date of Patent: Nov. 6, 1990

[54] TORQUE TRANSMITTING ASSEMBLY
[75] Inventor: Ronald F. Hamblin, Luton, United Kingdom
[73] Assignee: SKF (U.K.) Limited, United Kingdom
[21] Appl. No.: 194,146
[22] Filed: May 16, 1988
[30] Foreign Application Priority Data
 May 19, 1987 [GB] United Kingdom ............... 8711753
[51] Int. Cl.$^5$ .............................. B25G 3/28; F16B 2/00
[52] U.S. Cl. .................................... 403/354; 403/373; 403/261
[58] Field of Search .............. 403/373, 374, 377, 261, 403/354

[56] References Cited
U.S. PATENT DOCUMENTS

| 2,805,873 | 9/1957 | Brennan et al. | |
| 3,012,799 | 12/1961 | Mayne | 403/377 |
| 3,312,115 | 4/1967 | Braselmann | 74/141.5 |
| 3,334,931 | 8/1967 | Holt et al. | 287/58 |
| 3,402,947 | 9/1968 | Lewis | 285/317 |
| 3,419,292 | 12/1968 | Peltret et al. | 403/261 |
| 3,884,508 | 5/1975 | Jones | 285/31 |
| 3,905,209 | 9/1975 | Conrad | 64/15 R |
| 4,265,562 | 5/1981 | Seel | 403/374 |
| 4,345,850 | 8/1982 | Baumann | 403/373 |
| 4,620,356 | 11/1986 | Maus et al. | 403/373 X |

FOREIGN PATENT DOCUMENTS

| 904788 | 11/1945 | France . |
| 1392182 | 4/1975 | United Kingdom . |
| 1519583 | 8/1978 | United Kingdom . |
| 2169376A | 7/1986 | United Kingdom . |
| 2203222 | 5/1988 | United Kingdom . |
| WO 82/01750 | 5/1982 | World Int. Prop. O. . |

Primary Examiner—Andrew V. Kundraf
Attorney, Agent, or Firm—Kinney & Lange

[57] ABSTRACT

A torque transmitting assembly comprises a shaft, an article mounted on the shaft and a device secured to the shaft for transmitting torque between the shaft and the article. The device comprises an element which extends at least part the way round the shaft and fricitionally engages the shaft at two or more locations which lie in a first plane extending perpendicular to a second plane in which lies the longitudinal axis of the shaft. The first plane forms an angle with a third plane extending perpendicular to the longitudinal axis of the shaft, which angle is no greater than $\tan^{-1} \mu$, where $\mu$ is the coefficient of friction between the shaft and the element.

10 Claims, 4 Drawing Sheets

TORQUE TRANSMITTING ASSEMBLY

This invention relates to an assembly for transmitting torque comprising a shaft, an article mounted on the shaft and a device for transmitting torque between the two.

An article, able to be driven or to drive another article in rotation, such as a pulley, a sprocket or gear is commonly mounted on a shaft and secured in position for the transmission of torque between the shaft and the article by means including: a keyway and key; splines; a tapered portion of the shaft; flats on the shaft against which a screw or other device makes contact, and others.

These constructions are expensive and difficult to produce and can necessitate the use of a larger diameter shaft so that when, for example, a keyway is cut into the shaft, the shaft still has the requisite strength. In some of the known constructions, further expense is incurred in cutting a screw-thread on the shaft to receive a nut for axially restraining the article.

The prior art also includes documents disclosing the use of a ring mounted on a shaft.

In the following documents, there is plastic deformation of the ring and/or the shaft:
US-A-3012799; Mayne
EP-A-0170187 (≡tUS-A-4620356); Interaton
US-A-3905209; Conrad In the following documents, one or more rings are canted and held in place by means such as springs, screws and the like:
GB-A-1392182; Airscrew
US-A-3884508; Jones
WO-A-82/01750; Konejukka
FR-A-904788; Maschinenhau
US-A-4345850; Baumann
US-A-3402947; Lewis
US-A-2805873; Brennan
GB-A-1519583; Rolls-Royce
US-A-3334931; Holt
US-A-3312115; Braselmann GB-A-2169376 (SKF) discloses the use of a ring for preventing movement of an article along a shaft. The ring engages the shaft at locations which lie in a first plane. This first plane extends perpendicular to a second plane in which lies the axis of the shaft. A third plane extends perpendicular to the axis. The angle between the first and third plane is $\tan^{-1} \mu$, where $\mu$ is the coefficient of friction between the ring and the shaft. However, there is no disclosure in this document of transmitting torque.

The object of the invention is an assembly for transmitting torque which is relatively cheap, requiring little or no machining of the shaft and which is relatively quick and easy to assemble.

The invention provides an assembly for transmitting torque comprising a shaft which is mounted for rotation about its longitudinal axis, an article which is mounted on the shaft and is able to be driven or to drive another article in rotation, and a device which is secured to the shaft for transmitting torque between the shaft and the article, wherein the device comprises an element extending at least part the way round the shaft and which, during assembly, can be moved along the shaft and then caused to adopt a position in which it frictionally engages the shaft at two or more locations which lie in a first plane extending perpendicular to a second plane in which lies the longitudinal axis of the shaft, the first plane forming an angle with a third plane extending perpendicular to the longitudinal axis of the shaft, which angle is no greater than $\tan^{-1}\mu$, where $\mu$ is the coefficient of friction between the shaft and the element.

The following advantages can be gained by the use of such a device in the assembly: little or no machining of the shaft; the device can be positioned at any suitable position along the length of the shaft; simple and quick mounting and dismounting without substantially disturbing the surface of the shaft; bending stresses are kept to a minimum since no screw-threads, grooves or other recesses in the surface of the shaft are required; and the possibility of using a smaller diameter shaft leading to gains in production and operation.

A ring is a preferred shape of the element for a cylindrical shaft with the bore of the ring preferably being circular and of a diameter slightly greater than that of the shaft.

The element may engage the article and prevent it from moving along the shaft in the direction from the article to the element. The following advantages can be gained from this construction: the device creates little or no axial pressure on the article; a self-locking feature in that force applied to the article to move it towards the element of the device significantly increases the retention force of the element; and the device cannot accidently be released by applying force to the element of the device in the direction towards the article if the article cannot move in that direction.

Preferably, the element has one or more projections engaging the article.

To locate the article on the shaft, that is to prevent the article from moving in one direction along the shaft, the article is first mounted on the shaft at the desired location. The element, for example, a ring, is moved along the shaft and arranged so that a portion of the ring contacts the article and diametrically opposite parts of the inner bore periphery frictionally contact the shaft. A force, such as a sudden blow, is then applied to the ring, at a location diametrically opposite to that of the portion contacting the article, and in a direction from the ring to the article, to urge the diametrically opposite parts of the inner bore periphery into engagement with the shaft. Depending on the shape of the article, the ring may or may not require one or more projections to engage the article. The force directed axially with respect to the shaft, in practice, will be equal to or greater than the reaction force required from the ring, that is, the non-slip reaction force.

With the article prevented by the ring from moving along the shaft, in the direction from the article to the ring, the angle that a diametral line of the ring, joining the locations of engagement of the ring with the shaft, makes with a plane extending perpendicular to the axis of the shaft will be not greater than the slip angle. For lubricated steel, a typical coefficient of friction $\mu = 0.14$. The slip angle $\phi = \tan^{-1} \mu = 0.14$ radians or 8°. The toleranced diameter of the bore of the ring can then be of the same order as that of the shaft, for example, tolerance grade 6, as defined in British Standard 4500, Part 1, 1969 ISO Limits and Fits.

The ring may have a smooth bore or it may have one or more projections extending generally radially inwardly with respect to the longitudinal axis of the shaft and frictionally engaging the shaft.

If the ring engages the shaft at more than two locations, the locations of engagement lie in one plane (the first plane) which extends perpendicular to a plane (the second plane) in which lies or extends the longitudinal axis of the shaft. The angle to be considered then is the angle between the first plane and a plane (the third plane) extending perpendicular to the longitudinal axis of the shaft.

Preferably, the article and the device have co-operating projections and/or recesses through which torque can be transmitted. At least one projection may extend longitudinally from the element into a recess of the article having flat sides. Two projections may extend from the element and on opposite sides of a projection which extends longitudinally from the article and has flat sides.

The co-operating projection and/or recess may have sides tapering along the length of the axis so as to produce a snug fit during assembly.

An elongate member may engage in longitudinally aligned apertures in the element and the article. In such a construction, the positioning of the article may be by means other than the device, for example by using a circlip. The elongate member and the aperture in the article may have co-operating screw-threads.

Embodiments of the invention will now be described by way of example and with reference to the accompanying drawings, of which:

Figure 1:
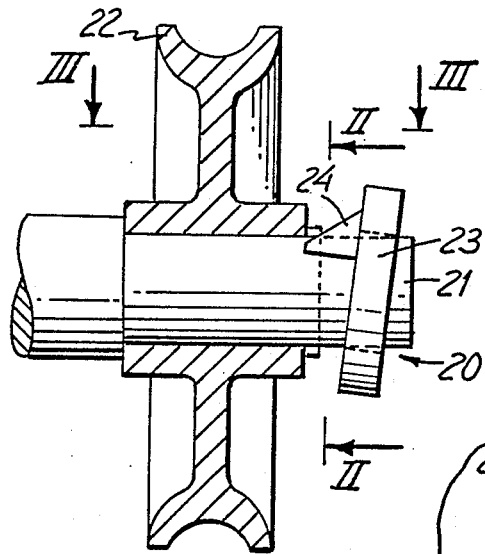
FIG. 1 is a schematic view of an assembly comprising a shaft with a pulley and a locking ring mounted on the shaft, the pulley having a flat-sided slot and the ring having two projections.
Figure 2:
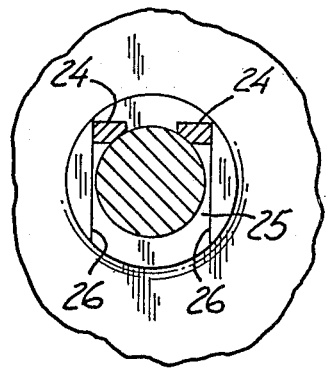
FIG. 2 is a view on II—II of FIG. 1.
Figure 3:
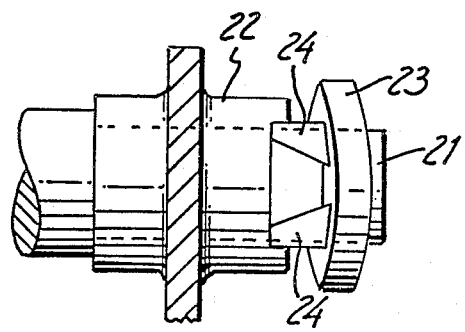
FIG. 3 is a view on III—III of FIG. 1.
Figure 3A:
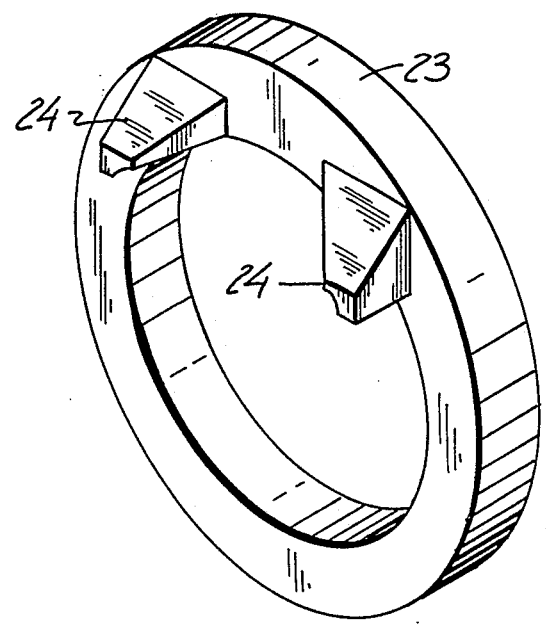
FIG. 3A is an isometric view of a locking ring shown in FIG. 1.

FIGS. 1, 2 and 3 show an assembly comprising a cylindrical shaft 20 having a stepped end 21 forming a shoulder. A pulley 22 is mounted with a clearance fit on the stepped end 21 and abuts the shoulder. The pulley 22 is prevented from moving along the stepped end 21 of the shaft 20 away from the shoulder by a locking ring 23 mounted on the shaft. The ring 23 has inner bevelled edges and a circular bore which is slightly greater than the diameter of the stepped end 21 of the shaft 20 (a clearance fit) and has two projections or noses 24 extending longitudinally from one end face and engaging the pulley 22. The ring 23 is tilted and frictionally engages the stepped end 21 of the shaft 20 at two diametrically opposed locations which lie on a diametral line extending between the projections 24. These locations of engagement lie in a first plane extending perpendicular to a second plane which includes the longitudinal axis of the shaft 20. A third plane extends perpendicular to the longitudinal axis of the shaft 20. The first and third planes form an angle which is no greater than $\tan^{-1}\mu$, wherein $\mu$ is the coefficient of friction between the shaft 20 and the ring 23.

To mount the ring 23, it is simply slid along the shaft end 21 until the noses 24 contact the pulley 22. Then an axial force such as a sudden blow is applied to the portion of the ring 23 nearer the pulley 22, which portion is diametrically opposite to the projections 24 and on the opposite end face, until the required non-slip reaction force is achieved, that is, the ring 23 adopts a position with an angle below the described slip angle of $\tan^{-1}\mu$.

In this assembly, there must be a gap between the pulley 22 and the portion of the ring 23 nearer the pulley 22 to avoid close tolerances in manufacture and assembly and ensure that the projections 24 engage the pulley.

The retaining force has the same value as the axial load applied. Any additional movement of the pulley 22 beyond this load will cause a slight movement of the ring 23 resulting in a self-locking force of increasing intensity up to the strength of the ring.

For the transmission of torque, the pulley 22 has a radially extending slot 25 with flat, parallel and opposed sides 26. Both of the noses 24 extend into the slot 25 and engage respective sides 26 with little or no clearance so that torque can be transmitted in either direction of rotation.

Figure 4:
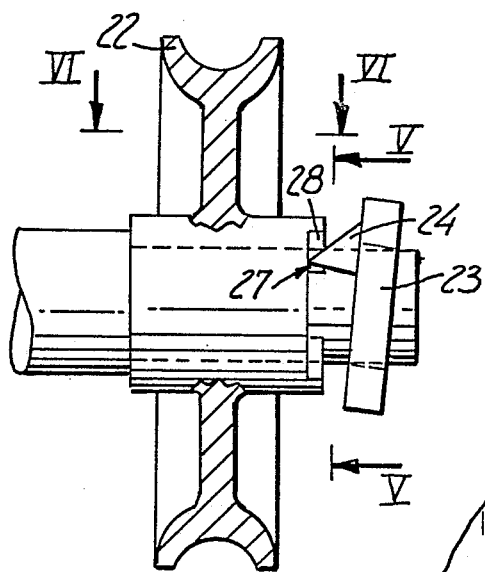
FIG. 4 is a schematic view of an assembly comprising a shaft with a pulley and a locking ring mounted on the shaft, the locking ring having two projections extending on opposite sides of a flat-sided projection of the pulley.
Figure 5:
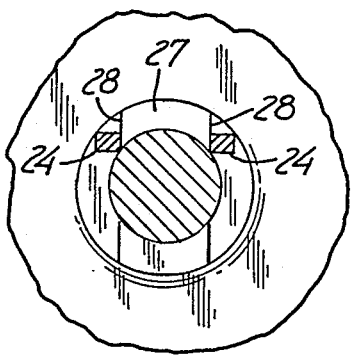
FIG. 5 is a view on V—V of FIG. 4.
Figure 6:
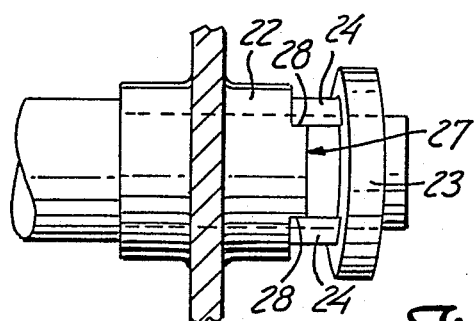
FIG. 6 is a view on VI—VI of FIG. 4.

The construction shown in FIGS. 4, 5 and 6 is, in principal, the same as that of FIGS. 1, 2 and 3, except that, in place of the slot 25, the pulley 22 has a longitudinally extending projection 27 with flat, parallel and opposed sides 28. The noses 24 of the locking ring 23 extend on opposite sides of the projection 27 and engage, with little or no clearance, the respective sides 28.

Figure 7:
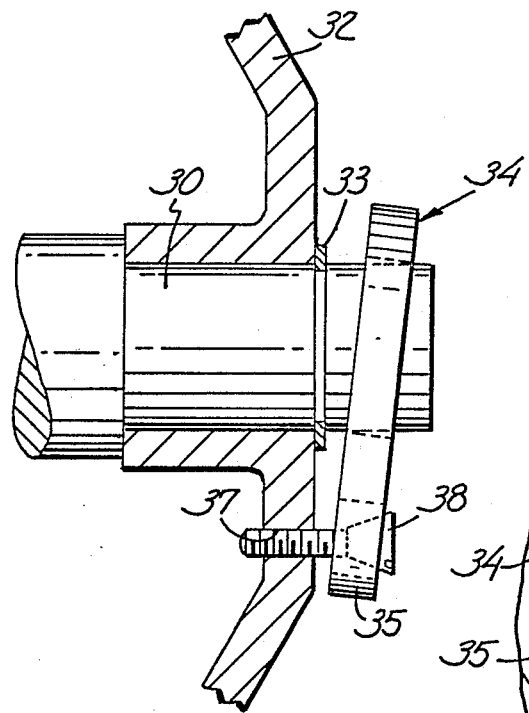
FIG. 7 is a schematic view of an assembly comprising a shaft with an article and a ring mounted on the shaft, with a screw-connection between the article and the ring.
Figure 8:
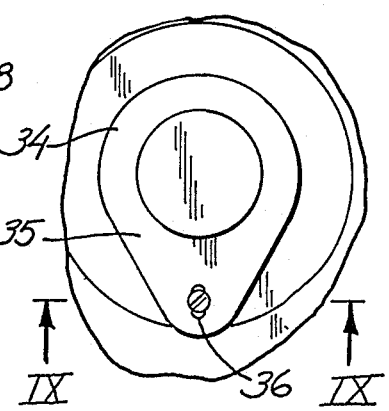
FIG. 8 is an end view to a smaller scale of the assembly of FIG. 7.
Figure 9:
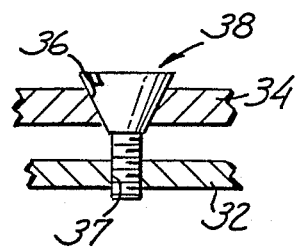
FIG. 9 is a view on IX—IX of FIG. 8.

FIGS. 7, 8 and 9 show an assembly comprising a cylindrical shaft 30 having a stepped end 31 forming a shoulder. An article 32 is mounted on the stepped end 31 with a clearance fit and abuts the shoulder. The article 32 is held in place by a circlip 33 engaging in a groove in the shaft. A ring 34 is mounted on the shaft 30 as for the embodiment of FIGS. 1, 2 and 3 except that the ring 34 has no projections or noses and does not engage the article 32—a gap being present between the article 32 and the ring 34. Instead the ring 34 has a radially extending lug 35 with an elongate aperture 36 extending radially of the shaft 30. The distance from the radially inner end of the aperture 36 to the bore of the ring 34 is no less than the radial dimension of the rest of the ring so that the overall strength of the ring is maintained. The longer sides of the aperture 36 converge with each other towards the article 32. The article 32 has a screw-threaded bore 37 aligned longitudinally with the elongate aperture 36 and a screw 38, with a conical head engaging in the aperture 36, is screwed into the bore 37. Torque is thus transmitted between the article 32 and the ring 34 by way of the screw 38.

Figure 10:
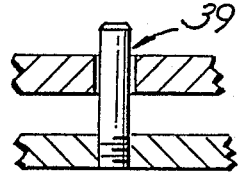
FIG. 10 is a view similar to FIG. 9 but showing a pin.

By having the aperture 36 extending as it does, the screw 38 does not interfere with the locking of the ring 34 on the shaft 30. By having co-operating converging surfaces of the aperture 36 and the screw 38, all clearance between the aperture and screw is taken up preventing backlash in case of torque reversal. A bolt can be used in place of the screw 38, or as shown in FIG. 10, a pin 39 can be used. The pin 39 can have a tapered recess in its head to receive an element for expanding the pin in the aperture to take up any clearance. Alternatively, a rubber or plastics ring or sleeve can be fitted around the pin in the aperture to take up any clearance and damp any shock loads.

The assembly of FIG. 7, 8 and 9 can of course be modified by not having the circlip 33 and by the ring 34 engaging the article 32.

What is claimed is:

1. An assembly for transmitting torque comprising a shaft which is mounted for rotation about its longitudinal axis, an article which is mounted on the shaft and is able to be driven or to drive another article in rotation, and a device which is secured to the shaft for transmitting torque between the shaft and the article, the device comprising an element extending at least part way round the shaft and which, during assembly, can be moved along the shaft and then caused to adopt a position in which it frictionally engages the shaft at two or more locations which lie in a first plane extending perpendicular to a second plane in which lies the longitudinal axis of the shaft, the first plane forming an angle with a third plane extending perpendicular to the longitudinal axis of the shaft which angle is no greater than $\tan^{-1} \mu$, where $\mu$ is the coefficient of friction between the shaft and the element wherein the device and the article are at least indirectly connected for the transmissions of torque.

2. An assembly as claimed in claim 1, wherein the element is a ring.

3. An assembly as claimed in claim 1, wherein the element engages the article and prevents movement of the article along the shaft in the direction from the article to the element.

4. An assembly as claimed in claim 3, wherein the element has at least one projection engaging the article.

5. An assembly as claimed in claim 1, wherein the element has at least one projection extending generally radially inwardly with respect to the longitudinal axis of the shaft and frictionally engaging the shaft.

6. An assembly as claimed in claim 1, wherein the article and the device have co-operating projections and/or recesses through which torque can be transmitted.

7. An assembly as claimed in claim 1, wherein an elongate member engages in longitudinally aligned apertures in the element and the article.

8. An assembly as claimed in claim 7, wherein the elongate member and the aperture in the article have co-operating screw-threads.

9. An assembly for transmitting torque comprising a shaft which is mounted for rotation about its longitudinal axis, an article which is mounted on the shaft and is able to selectively drive and be driven by another article in rotation, and a device which is secured to the shaft for transmitting torque between the shaft and the article, the device comprising an element extending at least part way round the shaft and which, during assembly, can be moved along the shaft and then caused to adopt a position in which its frictionally engages the shaft at two or more locations which lie in a first plane extending perpendicular to a second plane in which lies the longitudinal axis of the shaft, the first plane forming an angle with a third plane extending perpendicular to the longitudinal axis of the shaft which angle is no greater than $\tan^{-1} \mu$, where $\mu$ is the coefficient of friction between the shaft and the element, wherein the article and the device have cooperating projections and recesses through which torque can be transmitted comprising at least one projection which extends longitudinally from the element into a recess of the article, said recess having flat sides.

10. An assembly for transmitting torque comprising a shaft which is mounted for rotation about its longitudinal axis, an article which is mounted on the shaft and is able to selectively drive and be driven by another article in rotation, and a device which is secured to the shaft for transmitting torque between the shaft and the article, the device comprising an element extending at least part way round the shaft and which, during assembly, can be moved along the shaft and then caused to adopt a position in which it frictionally engages the shaft at two or more locations which lie in a first plane extending perpendicular to a second plane in which lies the longitudinal axis of the shaft, the first plane forming an angle with a third plane extending perpendicular to the longitudinal axis of the shaft which angle is no greater than $\tan^{-1} \mu$, where $\mu$ is the coefficient of friction between the shaft and the element, wherein the article and the device have cooperating interfitting members through which torque can be transmitted, said interfitting members comprising two projections extending longitudinally from the element and on opposite sides of a projection which extends longitudinally from the article and has flat sides.

* * * * *